June 5, 1934.　　　W. L. WRIGHT　　　1,961,471
FILM GUIDE CONSTRUCTION
Filed Sept. 25, 1928　　2 Sheets-Sheet 1
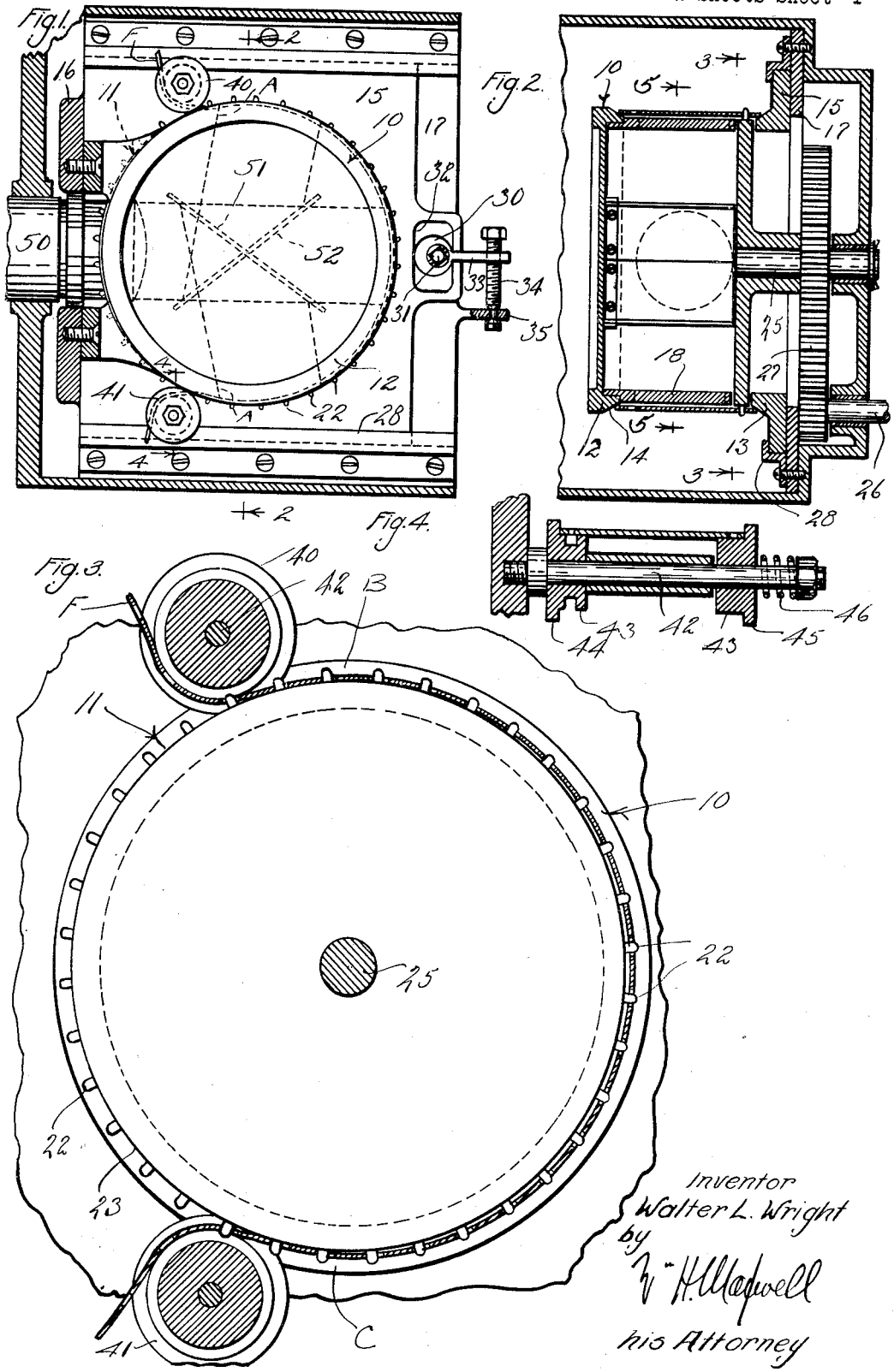
Inventor
Walter L. Wright
by
his Attorney

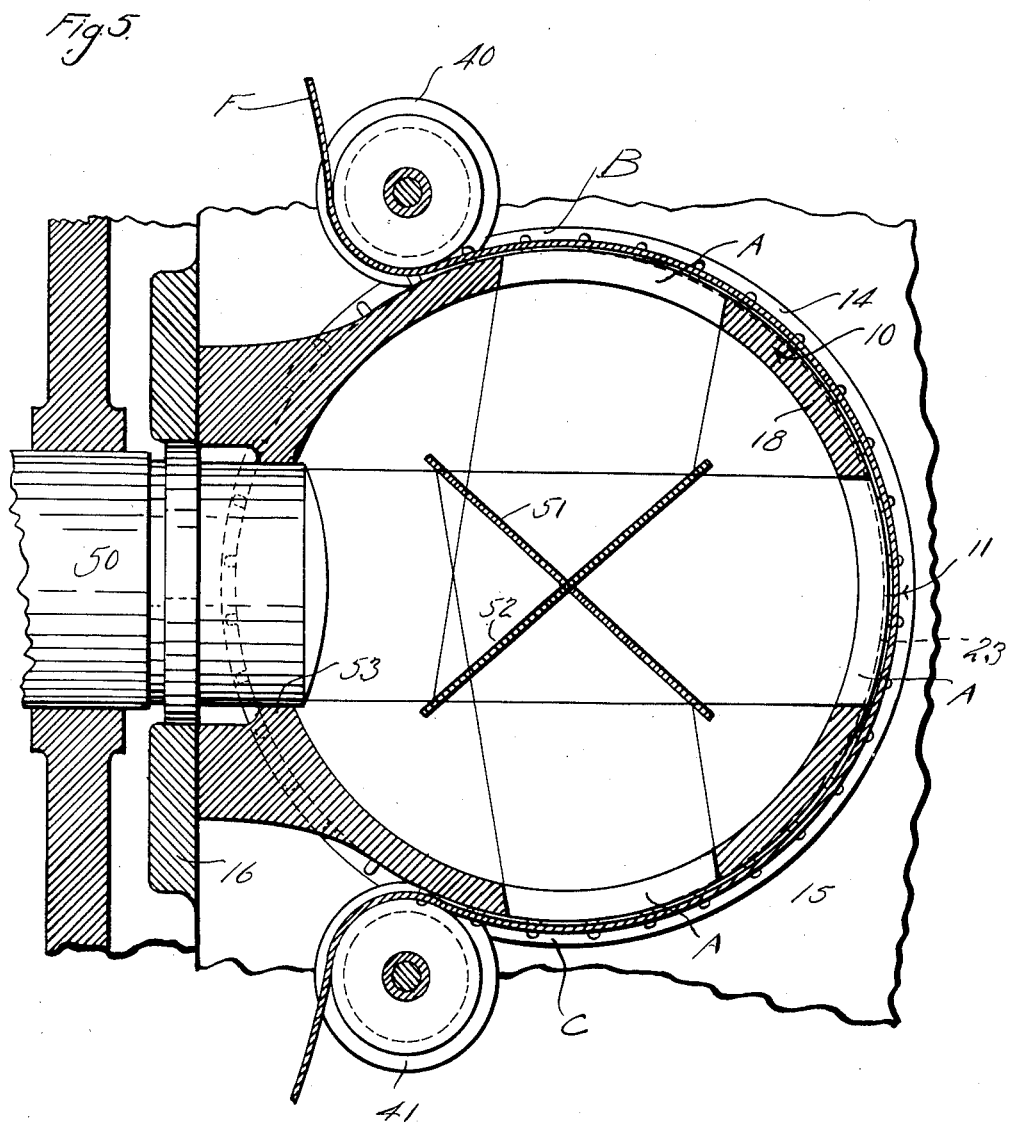

UNITED STATES PATENT OFFICE 1,961,471

FILM GUIDE CONSTRUCTION

Walter L. Wright, Santa Monica, Calif., assignor to Synchrome Corporation, Los Angeles County, Calif., a corporation of California Application September 25, 1928, Serial No. 308,241

13 Claims. (Cl. 88—17)

This invention has to do with a construction for use or embodiment in cameras, projectors, printers or other devices handling film, and it is an object of the invention to provide an improved, practical construction having particular value in motion picture apparatus and in color photography.

Various methods of color photography require the use of ordinary strip film carrying series of pictures, each series comprising a plurality of pictures of different color values of a subject taken simultaneously and from a single angle. For various practical reasons it is desirable to space adjoining pictures of each series and to mesh adjoining series together. A film such as I have just referred to is set forth in United States Letters Patent No. 1,217,391 issued to Colin N. Bennett, February 27, 1917, entitled Color cinematography.

In practice difficulty is experienced in handling film of this type as the film stock is affected by age, temperature conditions, and climatic conditions so that variation occurs in the spacing of the several pictures of a series.

It is an object of this invention to provide a mechanism for handling a film such as I have referred to so that the variation in the spacing of the pictures on the film is handled to overcome its detrimental effects.

Another object of the invention is to provide a mechanism such as I have referred to wherein the several pictures of a series are definitely located with reference to a common point regardless of their positioning or spacing with reference to each other on the film.

Another object of the invention is to provide a mechanism operable to definitely position a film by holding it at spaced points and engaging it at a third point intermediate said points.

It is another object of this invention to provide a mechanism of the general character above referred to wherein the film is continuously supported between the points with reference to which it is located.

Another object of the invention is to provide a mechanism of the type referred to wherein the film is held in a definite predetermined position as well as being located with reference to predetermined points.

A further object of my invention is to provide a mechanism for positioning a film in a continuous curve around a rotatable actuating member and with spaced parts in predetermined positions in regard to said member.

It is another object of the invention to provide a mechanism for holding a section of film in a definite curved position and engaging it at its ends to locate them in predetermined positions.

Another object of the invention is to provide a film handling mechanism wherein a film is supported throughout a substantial portion of its length and can be advanced or moved smoothly and with a minimum of friction.

A further object of my invention is to provide a construction operable to hold a length of film in a true position in a guide without clamping or otherwise engaging it at the guide.

Another object of this invention is to provide a film handling mechanism in which the film is locked or set in operating engagement with the sprocket without the use of pressure plates or other such means.

The various objects and features of my invention will be best and more fully understood from the following detailed description of a typical preferred form of the invention, throughout which description I refer to the accompanying drawings, in which:

Fig. 1 is a side elevation of the mechanism showing a typical film in place in it. Fig. 2 is a detailed sectional view of the mechanism, being a view taken as indicated by line 2—2 on Fig. 1. Fig. 3 is an enlarged detailed sectional view taken as indicated by line 3—3 on Fig. 2. Fig. 4 is an enlarged detailed sectional view taken as indicated by line 4—4 on Fig. 1, and Fig. 5 is an enlarged sectional view taken as indicated by line 5—5 on Fig. 2.

The mechanism provided by this invention is intended, generally, for handling flexible film and may be used to advantage in various classes of photography or photographic work. For example, the invention may be used in cameras, projectors, printers, and like mechanisms, and may be used in still photography as well as in motion picture photography. The invention is particularly valuable in the field of motion picture photography and in handling film for color processes. I will therefore confine the following detailed disclosure to a typical form of the invention applied to a camera suitable for the taking of motion pictures, it being understood that such specific reference is not to be construed as a restriction or limitation upon the broader principles of the invention.

The invention provides, generally, two relatively movable elements, one a film support or carrier 10, and the other a film actuating member 11. The film carrier is designed to support the film in a definite or predetermined curved position, for instance about a central axis, while the operating member is adapted to move the film and definitely position spaced parts of the film, for example the opposite end portions of the held part of the film. The film carrier 10 is preferably designed to support a section or length of the film F in a curved position about a common or central axis. Further, in accordance with the invention the carrier is constructed to support the film from its edges or corners rather than by engagement with either of its faces. The carrier comprises two principal parts or film guides, 12 and 13, which are curved in the desired manner and are spaced apart to receive or support the film F at its edges, as clearly illustrated in Fig. 2 of the drawings. In the particular case illustrated the guides 12 and 13 are curved about a common central axis and each guide has an inclined or bevelled bearing face 14 to receive the film F. The faces 14 of the guides are faced inwardly and cooperate to form a trough in which the film is supported through lines of contact occurring at the edges of the film. The faces 14 of the guides are preferably made hard and are finished to be very smooth so that the film will slide along them with a minimum of resistance or friction.

The guides 12 and 13 are co-axial and are fixed or stationary relative to each other. In the construction illustrated the guides 12 and 13 are connected through a mounting comprising a plate 15 and a flange 16 projecting from the plate. The plate 15 is mounted in the housing or casing of the camera, for instance it may be mounted on a part 17 of the camera housing while the guide 12 is carried by the flange 16 which projects laterally from the plate 15.

In the preferred construction the film carrier includes a curved plate 18 located between the guides 12 and 13. The plate may act as an aperture plate in which case it may be provided with a plurality of exposure apertures A, as illustrated in the drawings. In the particular case illustrated three spaced parts of the film are to be exposed simultaneously by shafts of light projected outwardly onto the film. In this case there are three apertures A in the plate 18. In accordance with the preferred arrangement of parts, the film actuating member is arranged adjacent one of the guides to engage the perforated edge portion of the film. In the case shown the member 11 is located adjacent the guide 13 carried by the plate 15, making it advantageous to arrange the guide 12 and aperture plate 18 together, as clearly illustrated in Fig. 2. It is to be understood, of course, that the aperture plate may be curved to correspond to the configuration of the film guides and that it may be proportioned so that its outer face 20 is close to the film F but does not touch it.

The film actuating member 11 is preferably in the form of a film sprocket mounted to operate adjacent one of the film guides so that the teeth of the sprocket cooperate with the perforations at one margin of the film. I have found that a sprocket having a single row of teeth 22 is sufficient. It is to be understood, however, that the invention may be carried out with a sprocket construction having a double row of teeth whereby the film is engaged at both margins. The film sprocket 11 is proportioned and arranged with reference to the film guides so that its teeth 22 cooperatively engage the film at spaced points, for instance, at points B and C in the vicinity of the end apertures A. In the preferred form of the invention the sprocket is made so that its diameter at its face 23 is substantially the same or slightly less than the diameter of the film supporting parts. The sprocket 11 is carried on a shaft 25 operated through gears 27 from the drive shaft 26 of a movement mechanism. It is to be understood, of course, that any suitable mechanism may be used to actuate the sprocket so that the film is operated in the desired manner.

In accordance with my invention, the film actuating member 11 and the film carrier 10 are relatively movable laterally, or in a direction at right angles to the general direction of their axes. In the case illustrated, the film carrier 10 is movable or shiftable with reference to the sprocket 11, the sprocket being mounted so that it operates about a fixed axis. In the construction shown the plate 15, carrying the film guide 13 and having the flange 16 which supports the film guide 12, is mounted in guideways 28 provided on the part 17 of the camera. The guideways 28 extend in a direction at right angles to the axis about which the film guides are curved.

The invention provides an arrangement whereby the plate 15 is normally held against movement in the guideways but can be operated or adjusted with reference to the sprocket when desired. In the particular construction illustrated an eccentric 30 is mounted on a fixed spindle 31 and operates in an opening 32 provided in the plate 15. An operating arm 33 extends from the spindle and is adapted to be operated by a screw 34 carried by a lug 35 on a stationary part of the camera. By operation of the lever 33 the eccentric is rotated causing the plate 15 to be shifted or moved in the guideways 28.

The film F is directed onto the carrier 10 by a roller 40 and is guided off of the carrier by a roller 41. The roller 40 is located to direct the film onto the carrier immediately ahead of the point B where the film is engaged by the sprocket, while the roller 41 is located just beyond or past the point C where the film is engaged by the sprocket. The roller 40 is provided to direct the film F into proper engagement with the guides and sprocket and may also operate to guide the film sideways or laterally into proper position in the guideway.

The roller 40 operates on a spindle 42 and has spaced hub parts 43 supporting the marginal portions of the film. One of the hub parts 43 operates at a fixed point on the spindle and has a flange 44 to engage one edge of the film while the other hub part is slidable on the spindle and has a flange 45 to engage the other edge of the film. A spring 46 is carried on the spindle to engage the last mentioned hub part to normally urge the flange 45 into pressure engagement with the film. The spring operates to hold the film in engagement with the flange 44 causing the film to be guided onto the carrier in a definite or predetermined lateral position. It will be obvious that proper locationing of the roller 41 will cause the film to be properly guided onto the guide parts 12 and 13 of the carrier. In practice the roller 40 is located close enough to the point B where the film is engaged by the sprocket so that the film is effectively held in cooperative engagement with reference to the sprocket. Likewise the roller 41 is located sufficiently close to the point C so that it operates to hold the film in proper cooperative position with reference to the sprocket.

My present invention may be carried out in connection with various optical arrangements it being obvious that the optical system may be external or internal with reference to the section of film held in curved position in the carrier. In the drawings I have illustrated an internal optical system in which light is admitted to the center of the construction through a suitable lens 50 and is properly divided and directed through the several apertures A by crossed chromatic light dividers 51 and 52. The details of an optical system such as may be used in this construction are set forth in my co-pending application entitled Optical system filed Nov. 15, 1927, Serial Number 233,375. With an optical system or arrangement such as I have illustrated and with the film carrier adjustable or movable relative to the actuating member it is desirable to have the optical system in fixed position with reference to the carrier. In the construction illustrated the lens device 50 is carried by a suitable part 53 provided on the aperture plate, while the light dividers 51 and 52 are supported from the guide 12.

In operation the film F is threaded or positioned in the mechanism as illustrated throughout the drawings so that it enters under the roller 40 to be definitely positioned between the guides 12 and 13 at the point B. The film then continues around the guides past the several apertures in the aperture plate 17 and passes from the guides over the roller 41 just beyond the point C. The carrier 10 is adjusted laterally with reference to the sprocket so that the film is made tight in the carrier. It will be obvious that the carrier can be laterally adjusted with reference to the actuating member so that the film is tightened onto the teeth of the sprocket at the points B and C and is somewhat relieved from the teeth of the sprocket intermediate these points. In practice the parts are preferably proportioned so that the sprocket barely clears the film intermediate the points B and C yet has its teeth engaged in the perforations of the film as illustrated in the drawings. It will be obvious that the carrier can be adjusted so that the film bears in the carrier with the desired pressure and with sufficient pressure to maintain a proper bearing or fit in the carrier and that adjustment of the carrier can be made to compensate for shrinkage or expansion of the film. In practice the movement of the axis of the carrier away from the axis of the sprocket in the direction of the held film section will be slight, and a single setting of the mechanism will accommodate a wide range of variation in the film. The fact that the film is unsupported between its lines of engagement with the guides allows it to give and thus compensates for variations. It is also to be noted that the rows of perforations adjoining the margins of the film cause such flexure or bending of the film between the guides to be confined almost entirely to the margins of the film so that the picture areas are left undistorted.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A film handling device including, a revoluble film sprocket having spaced teeth, and a film guide at the sprocket having a curved film guiding face slightly eccentric to the sprocket to guide a length of film in continuous engagement with the teeth of the sprocket so that the end portions of said length of film have bearing engagement with the periphery of the sprocket in opposite directions circumferentially on the sprocket.

2. In combination, a revoluble film advancing member, and a film guide holding a length of film curved and with parts of said length of film spaced a substantial distance apart longitudinally of the film in bearing engagement with the advancing member, the guide having oppositely inclined faces supporting only the edge of the film.

3. In combination, a revoluble film advancing sprocket, and a film guide having curved guide parts forming a trough with walls converging toward the center of the sprocket and supporting the film from its edges and in cooperative engagement with the sprocket.

4. In combination, a revoluble film advancing member, and a film guide normally stationary relative to the advancing member and having curved guide parts supporting the film from its edges and with spaced parts in cooperative engagement with the advancing member, the guide parts being convergent toward the center of the sprocket and forming a trough in which the film is carried.

5. In combination, spaced inclined guides supporting a film from its edges only and curved to support the film about a center, and a curved aperture plate between the guides following the curvature of the guides.

6. In combination, spaced curved film guides having beveled faces supporting a film at its edges only, and a curved aperture plate between the guides, the plates being concentric with the film guides.

7. In combination, spaced curved film guides slidably supporting only the margins of the film, a curved aperture plate between the guides and concentric with the guides, and a film advancing sprocket engaging the film where it is supported by the guides.

8. In combination, spaced curved film guides supporting a film at its edges only, a curved aperture plate between the guides and concentric with the guides, and a film advancing sprocket engaging the film supported by the guides, the sprocket being substantially concentric with the guides.

9. In combination, two members for handling film having longitudinally spaced perforations, one member a guide curved about a center and around which the film engages, the guide being operable to hold a portion of the film in a predetermined position and curved about said center, and the other member being a film advancing member having spaced teeth on its periphery cooperating with the perforations in the film throughout said portion to advance the film, the two members being related so that the body of the advancing member has bearing engagement only with parts of the film spaced apart at least 90° around the advancing member, and means holding the film on the guide member.

10. In combination, a revoluble film advancing member having circumferentially spaced projections for cooperating with spaced perforations in the film, and a film guide means including a single film supporting part curved about a center and over which the film passes, the said member and part being related so that the film is guided by the part to be in bearing engagement with the periphery of the body of the advancing member only at points spaced a substantial distance apart around the advancing member.

11. In combination, a revoluble film advancing member and a film guide having beveled surfaces supporting the film at its opposite edges only, said surfaces being substantially concentric with the advancing member and guiding the film for cooperative engagement with the advancing member.

12. In combination, a revoluble film advancing member having circumferentially spaced projections on its periphery for cooperating with spaced perforations in the film, and a film guide having beveled surfaces supporting the film at its opposite edges only, said surfaces being substantially concentric with the advancing member and guiding the film for cooperative engagement with the advancing member, the advancing member and guide being related so the film is held in cooperative engagement with the periphery of the advancing member only at points spaced a considerable distance around the advancing member.

13. In combination, a revoluble film advancing member, a film guide for supporting a length of film, the guide being substantially concentric with the advancing member and holding a portion of the film curved about the advancing member, the said portion being of substantially 180° in extent, and means whereby the advancing member and the guide are relatively movable laterally to establish the desired cooperative engagement between the advancing member and the film.

WALTER L. WRIGHT.